United States Patent
Oliver et al.

(10) Patent No.: US 6,863,163 B2
(45) Date of Patent: Mar. 8, 2005

(54) SELF LEVELING VEHICLE SUSPENSION DAMPER

(75) Inventors: Michael L. Oliver, Xenia, OH (US); William C. Kruckemeyer, Beavercreek, OH (US); Todd A. Bishop, Centerville, OH (US); Eric L. Jensen, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/235,049

(22) Filed: Sep. 4, 2002

(65) Prior Publication Data

US 2004/0040806 A1 Mar. 4, 2004

(51) Int. Cl.$^7$ .................................................. F16F 9/00
(52) U.S. Cl. ........................ 188/315; 188/313; 188/314; 267/64.17; 267/DIG. 2
(58) Field of Search ................................ 188/315, 313, 188/314, 318, 320, 322.19, 322.14, 297, 298, 301; 267/64.28, 64.17, DIG. 2

(56) References Cited

U.S. PATENT DOCUMENTS

| | | | |
|---|---|---|---|
| 2,332,161 A | * 10/1943 | McIntyre et al. | ............ 188/315 |
| 2,436,901 A | * 3/1948 | Rossman | ...................... 188/315 |
| 3,083,000 A | * 3/1963 | Perdue | ..................... 267/64.26 |
| 3,222,049 A | 12/1965 | Tuczek | |
| 3,380,729 A | 4/1968 | Hoffmann et al. | |
| 3,658,313 A | * 4/1972 | Hahn | ....................... 267/64.17 |
| 3,669,400 A | * 6/1972 | Lowe | ......................... 248/550 |
| 3,729,184 A | 4/1973 | Allinquant et al. | |
| 4,139,186 A | * 2/1979 | Postema et al. | ........ 188/322.19 |
| 4,240,531 A | * 12/1980 | Postema | ...................... 188/315 |
| 5,285,875 A | * 2/1994 | Munoz | ........................ 188/315 |
| 5,462,140 A | * 10/1995 | Cazort et al. | ................ 188/315 |
| 5,996,978 A | * 12/1999 | Asanuma et al. | ............ 188/315 |
| 6,161,662 A | 12/2000 | Johnston et al. | |
| 6,296,092 B1 | * 10/2001 | Marking et al. | ............. 188/315 |
| 6,374,966 B1 | * 4/2002 | Lillbacka | ..................... 188/315 |
| 6,382,371 B1 | 5/2002 | Oliver et al. | |
| 6,389,955 B1 | * 5/2002 | Schaefer | ......................... 92/86 |
| 6,456,912 B1 | 9/2002 | Raynauld et al. | |
| 6,527,093 B2 | 3/2003 | Oliver et al. | |
| 6,547,224 B2 | 4/2003 | Jensen et al. | |

OTHER PUBLICATIONS

Copy of European Search Report dated Dec. 23, 2003, copy enclosed.

* cited by examiner

Primary Examiner—Matthew C. Graham
Assistant Examiner—Mariano Sy
(74) Attorney, Agent, or Firm—Michael D. Smith (57) ABSTRACT

A suspension damper comprises a cylinder tube and a control partition. The cylinder tube is disposed within a reservoir tube to define a fluid reservoir, and has at least one first hole. The control partition is disposed in the fluid reservoir, and communicates with the at least one hole.

13 Claims, 12 Drawing Sheets

SELF LEVELING VEHICLE SUSPENSION DAMPER

TECHNICAL FIELD OF THE INVENTION

This invention relates generally to suspension systems for motor vehicles, and relates more particularly to a self leveling suspension damper.

BACKGROUND OF THE INVENTION

A suspension damper, commonly referred to as a shock absorber, reduces the amplitude of resilient suspension excursions between a sprung mass and an unsprung mass of a motor vehicle by converting into work a fraction of the kinetic energy of the sprung mass. Typically, a suspension damper includes a fluid-filled cylinder tube connected to the unsprung mass, a piston in the cylinder tube connected by a rod to the sprung mass, and valves on the piston which throttle fluid flow across the piston during compression and rebound strokes of the suspension damper attributable to relative suspension excursions between the sprung and unsprung masses. An example of a suspension damper is set forth in U.S. Pat. No. 6,161,662, the disclosure of which is hereby incorporated by reference. In a twin-tube suspension damper, fluid in the cylinder tube displaced by the connecting rod during a compression stroke of the suspension damper flows through a base valve to an annular reservoir around the cylinder tube and returns through the base valve during a rebound stroke of the suspension damper. In a monotube suspension damper, the volume of a gas chamber at an end of the cylinder tube opposite the connecting rod decreases and increases, respectively, during compression and rebound strokes of the suspension damper as the connecting rod enters and withdraws from the cylinder tube.

Suspension dampers are typically attached to a spring assembly of a vehicle suspension system. The spring force generally determines the height of the vehicle, and the damper controls the dynamic vehicle motion. Often, it is desirable to supplement the spring force to maintain a controlled vehicle height at different levels of vehicle load. One method of doing so is to affix a height leveling damper to the suspension system that adjusts the height of the vehicle relative to the load on the vehicle. To maintain the controlled vehicle height, the spring force may be supplemented with an air leveling damper that requires an external compressor and controller. An air sleeve is attached to the outside of the air leveling damper to supply an extending force to the damper for maintaining the controlled vehicle height. An example of a height leveling damper is set forth in U.S. Pat. No. 6,382,371, the disclosure of which is hereby incorporated by reference.

SUMMARY OF THE INVENTION

The present invention is a suspension damper comprising a cylinder tube and a control partition. The cylinder tube is disposed within a reservoir tube to define a fluid reservoir, and has at least one first hole. The control partition is disposed in the fluid reservoir, and communicates with the at least one hole.

Accordingly, it is an object of the present invention to provide a suspension damper of the type described above that is capable of adjusting the height of a motor vehicle.

Another object of the present invention is to provide a suspension damper of the type described above that is capable of adjusting the height of a motor vehicle using mechanisms completely concealed within the damper.

Still another object of the present invention is to provide a suspension damper of the type described above that adjusts the height of the motor vehicle according to the load on the vehicle.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
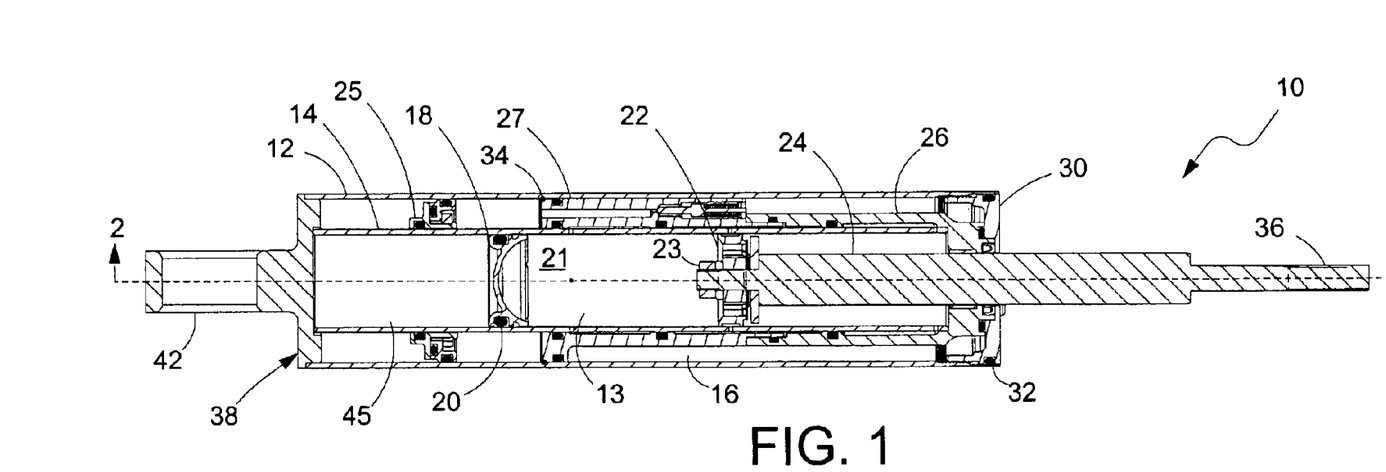
FIG. 1 is a cross-sectional view of a suspension damper according to the present invention.
Figure 2:
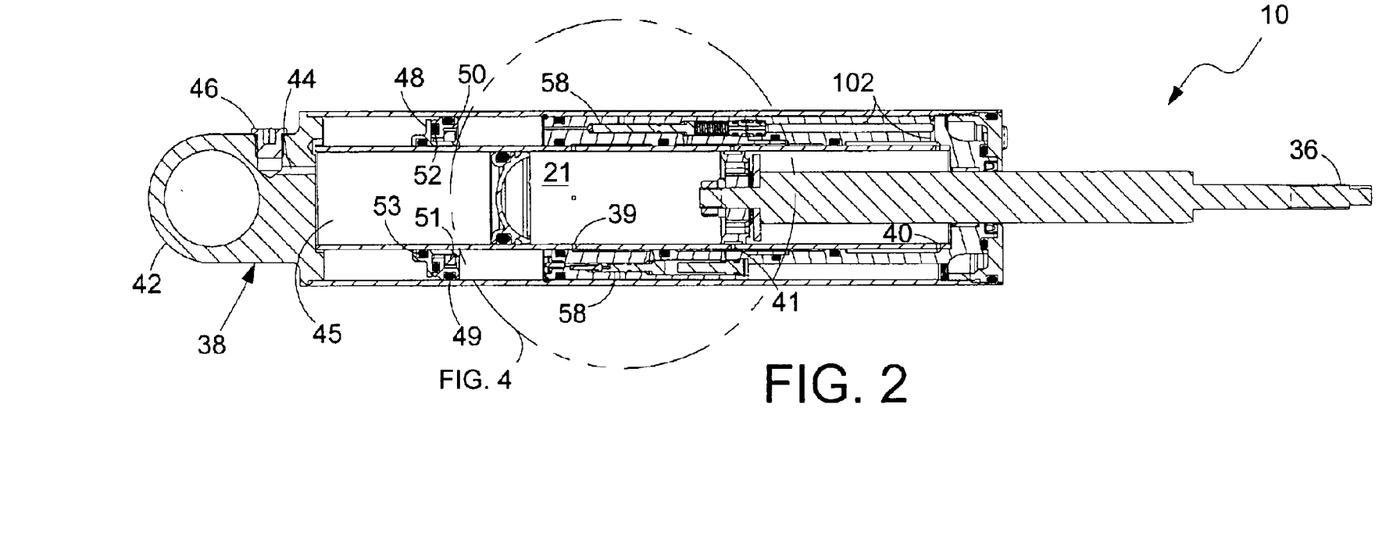
FIG. 2 is a cross-sectional view of the suspension damper taken along line 2—2 in FIG. 1.
Figure 3:
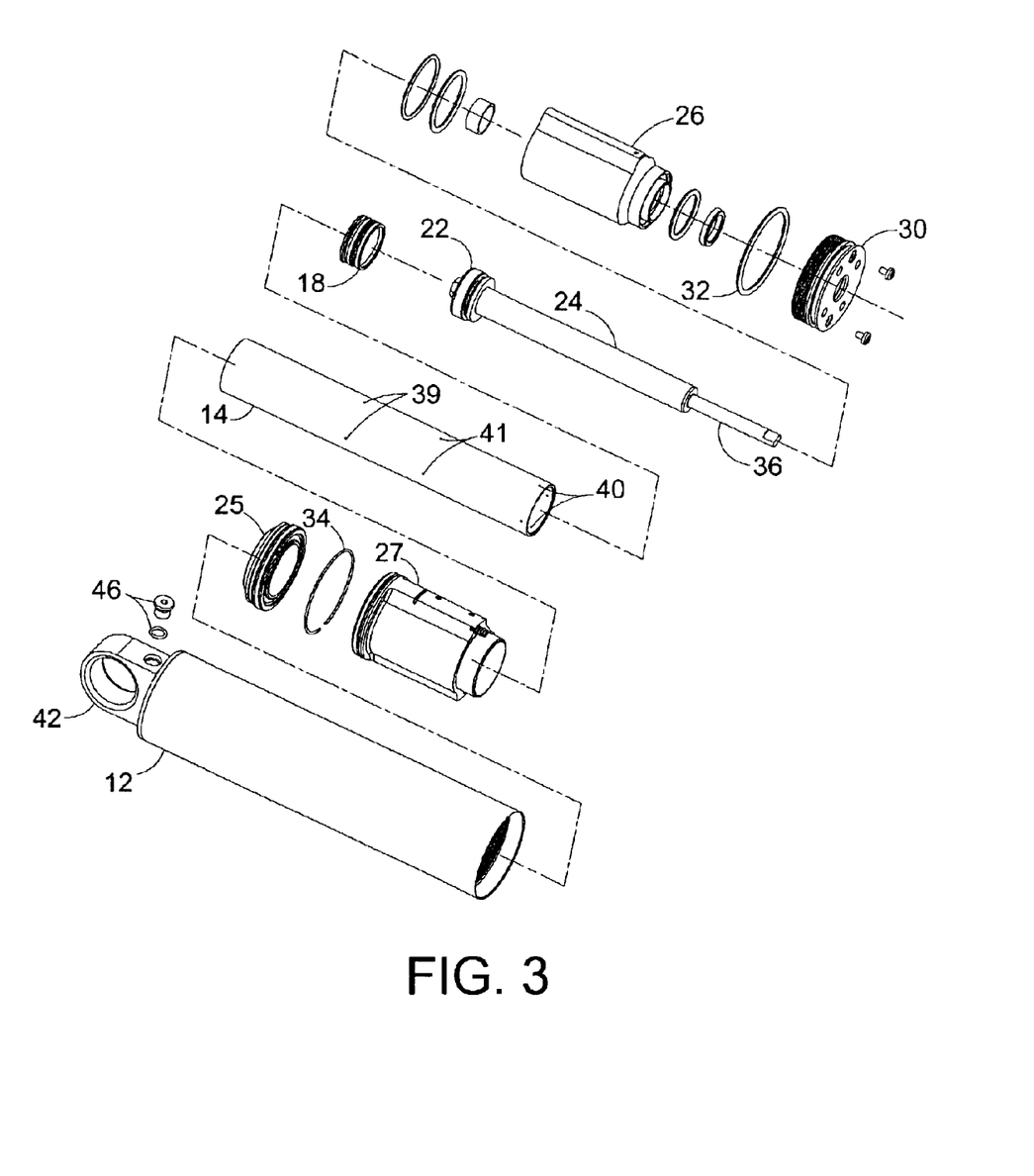
FIG. 3 is an exploded perspective view the suspension damper.

FIGS. 1 through 3 show one embodiment 10 of a suspension damper assembly capable of adjusting the height of a motor vehicle. A reservoir tube 12 forms a housing and has a cylinder tube 14 concentrically aligned within the reservoir tube 12. The cylinder tube 14 defines a pumping chamber 13. A fluid reservoir 16 is defined between the reservoir tube 12 and the cylinder tube 14. A movable gas piston or gas cup 18 is slidably disposed within the cylinder tube 14. The gas cup 18 and a seal 20 form a movable barrier between fluid in a damping chamber 21 and pressurized gas in a gas chamber 45.

A piston assembly 22 including a plunger 23 is slidably disposed within the cylinder tube 14. The plunger 23 is affixed to a piston shaft 24 that is inserted through a tube adapter 26 disposed proximate an end of the reservoir tube 12 opposite the gas cup 18. An end cover 30 is threaded onto the reservoir tube 12 and retains the tube adapter 26 to enclose the end of the reservoir tube. An end cover seal 32 seals the end cover 30 to the reservoir tube 12 thereby preventing fluid from leaking from the assembly 10.

The piston shaft 24 extends through an aperture in the end cover 30, and is adapted to include a fastening element proximate its distal end 36 to affix the assembly 10 to a suspension frame (not shown). A base cap 38 encloses the opposite end of the reservoir tube 12, and includes a base fastening element 42 to affix the assembly 10 to the suspension system of the vehicle. The base cap 38 includes an optional port 44 for adjusting during assembly the pressure of gas in the gas chamber 45. A plug and seal 46 close the port 44, and may include a gas check valve for preventing gas from exiting the gas chamber 45 during filling.

The inner tube 14 has a plurality of holes 39, 40, and 41 that facilitate and control leveling. A moving partition 25 defines a fluid chamber adjacent to a control partition 27, and a pressurized gas flow to the pressurized gas chamber 45. The moving partition 25 includes an inner body 48 that is closely fit with the inner tube 14. An outer carrier 50 is retained by a retaining ring 51, and is radially movable with respect to the inner body 48 to accommodate any misalignment between the outer tube 12 and the inner tube 14. A seal 52 seals the outer carrier 50 to the inner body 48, and seals 49 and 53 respectively seal the moving partition 25 assembly to the outer and inner tubes. A retaining ring 34 fits in a groove in the inner surface of the outer tube 12, and holds the control partition 27 and the tube adapter 26 in place.

Figure 4:
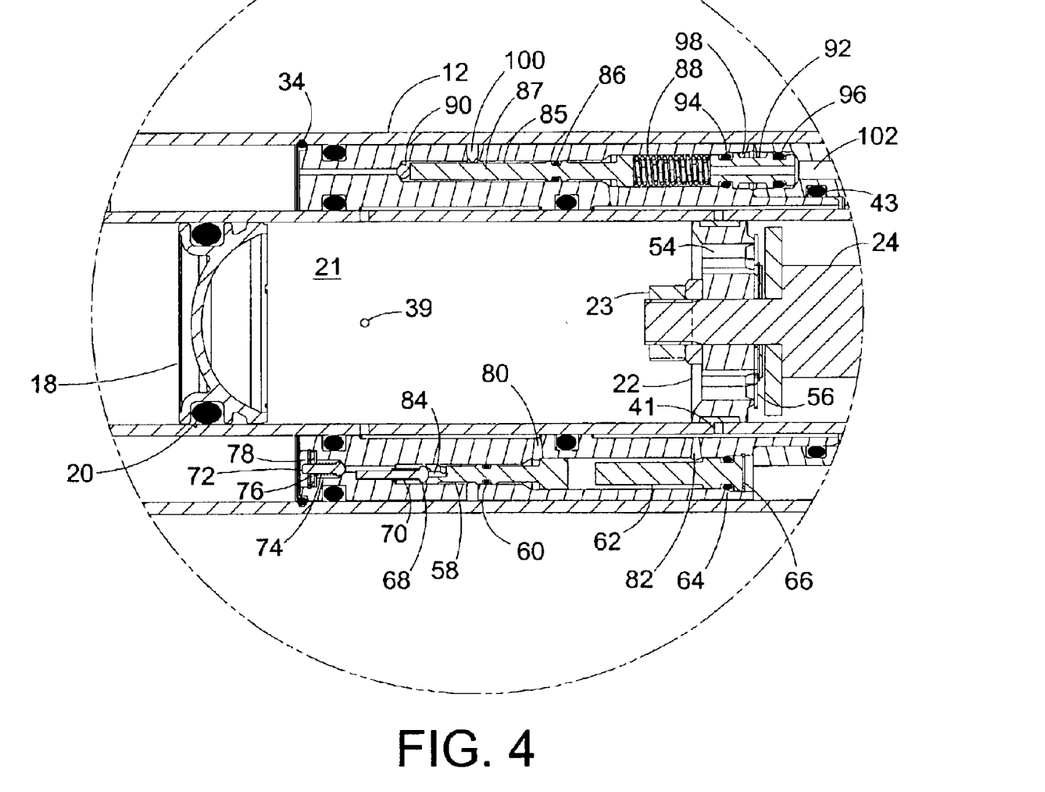
FIG. 4 is an enlarged view of the area denoted in FIG. 2.

FIG. 4 shows the piston assembly 22 including a plurality of passages 54 that allow fluid flow therethrough while the plunger 23 strokes inside the pumping chamber 13. A plunger plate 56 blocks the passages 54, but flexes under the force of the fluid to open the passages 54 such that they restrict, but do not prevent, the flow of fluid. The control partition 27 houses a pump that includes a pump piston 58, a seal 60, and a cap 62 that limits pump travel and seals the pump chamber via a seal 64. The cap 62 is held by a retaining ring 66. A valve 68 and a spring 70 act to form a check valve on the end of the pump piston 58, and to limit the travel of the pump piston. A pump output valve 72 and a spring 74 form a check valve controlling pump output, and are retained by a spring retainer plate 76 and a retaining ring 78.

When the piston 22 is between holes 39 and holes 41, and moving in a compression stroke toward the holes 39, fluid pressure at the holes 39 is higher than the pressure at the holes 41. The pressure at the holes 39 is transmitted to the underside of the pump piston 58 through a hole 80, and the pressure at the holes 41 is transmitted to the top of the pump piston through a hole 82, applying a lifting force on the pump piston. This causes fluid to be drawn from the fluid reservoir, through a passage 84 in the pump piston, through the valve 68 and into the chamber below the pump. During reverse movement of the piston 22 away from the holes 39 and toward the holes 41, pressure at the holes 41 is higher than pressure at the holes 39. Transmitted pressures press the piston down. The valve 68 and the spring 70 seal the passage 84 in the pump piston 58, and fluid under the pump piston is displaced our through the check valve formed by the output valve 72 and the spring 74.

Adding fluid to the chamber between the control partition 27 and the moving partition 25 moves the moving partition, reducing the volume available to the pressurized gas. This increases the gas pressure and increases the extending force exerted by the rod 24. This increased force, working with the vehicle springs, increases the height of the vehicle.

A release valve 85 also resides in a cavity in the control partition 27. The release valve includes a seal 86 on a release piston 87, a spring 88, a ball 90, and a cap 92 with seals 94 and 96. An optional pin 98 can be used to retain the parts during assembly. At rest, the cap 92 retains the spring 88, which presses the release piston 87 against the ball 90. The ball 90 seals a passage into the fluid chamber between the control partition 27 and the moving partition 25. The chamber around the release piston 87 between the ball seal and seal 86 is connected to the fluid reservoir by passage 100. The chamber defined by the underside of the release piston top is connected to the holes 41 of the inner tube 14. The top side of the release piston is connected to the inner tube holes 40 by a passage 102.

The release valve 85 operates when the piston 22 is between holes 41 and holes 40. During a piston compression stroke in this area, the fluid pressure at hole 41 is higher than at hole 40. This acts on the release piston 87 to counteract the force applied by the spring 88. This reduces the force sealing the ball 90, and allows fluid to flow from the cavity between the control partition 27 and the moving partition 25 into the reservoir. This allows the moving partition 25 to move, allowing the volume of the pressurized gas to increase. The outward force exerted by the rod 24 is thereby reduced, allowing the suspension spring of the vehicle to carry more of the vehicle load and resulting in a lower vehicle height.

Figure 5:
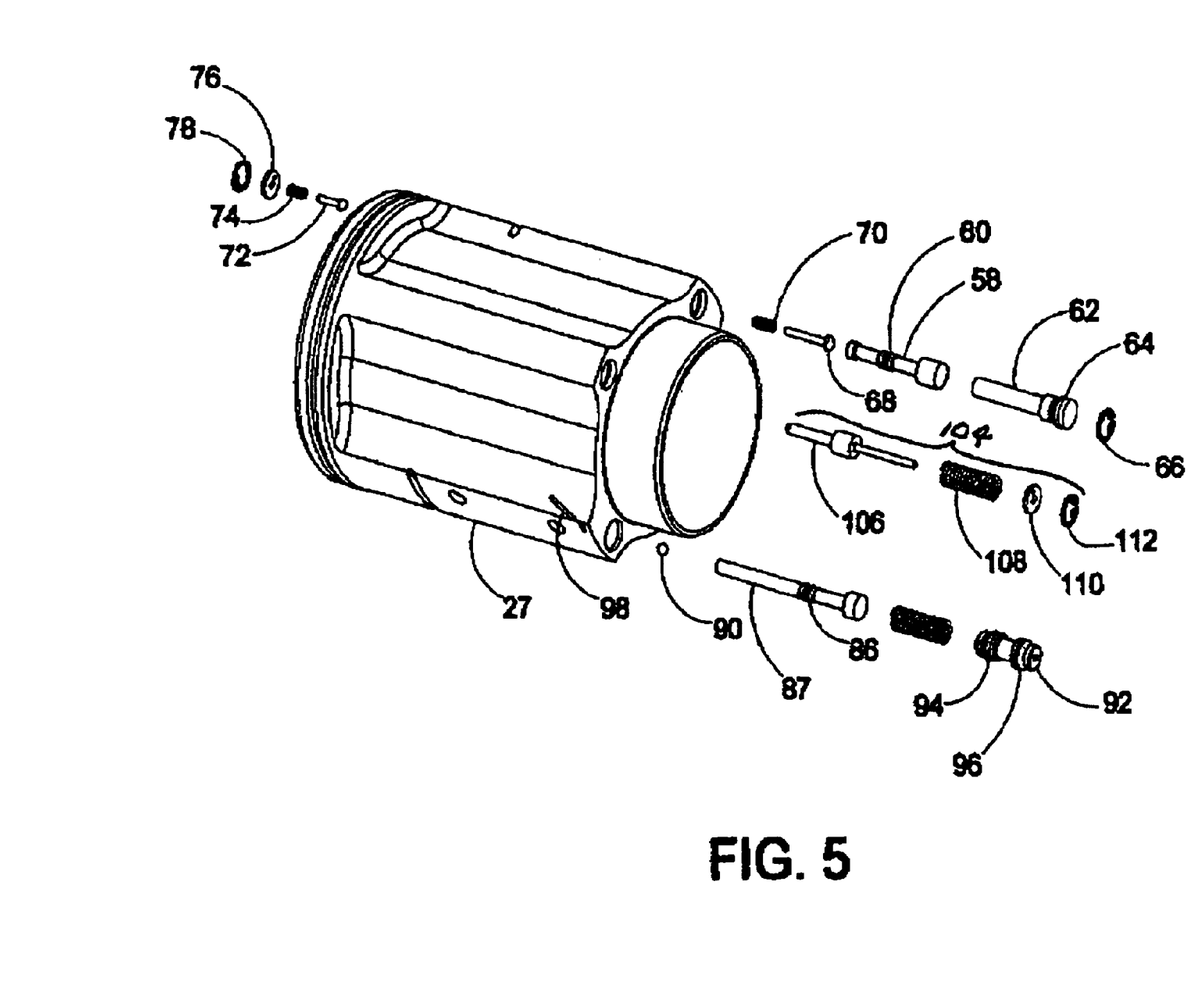
FIG. 5 is an exploded perspective view of a control partition of the damper.
Figure 6:
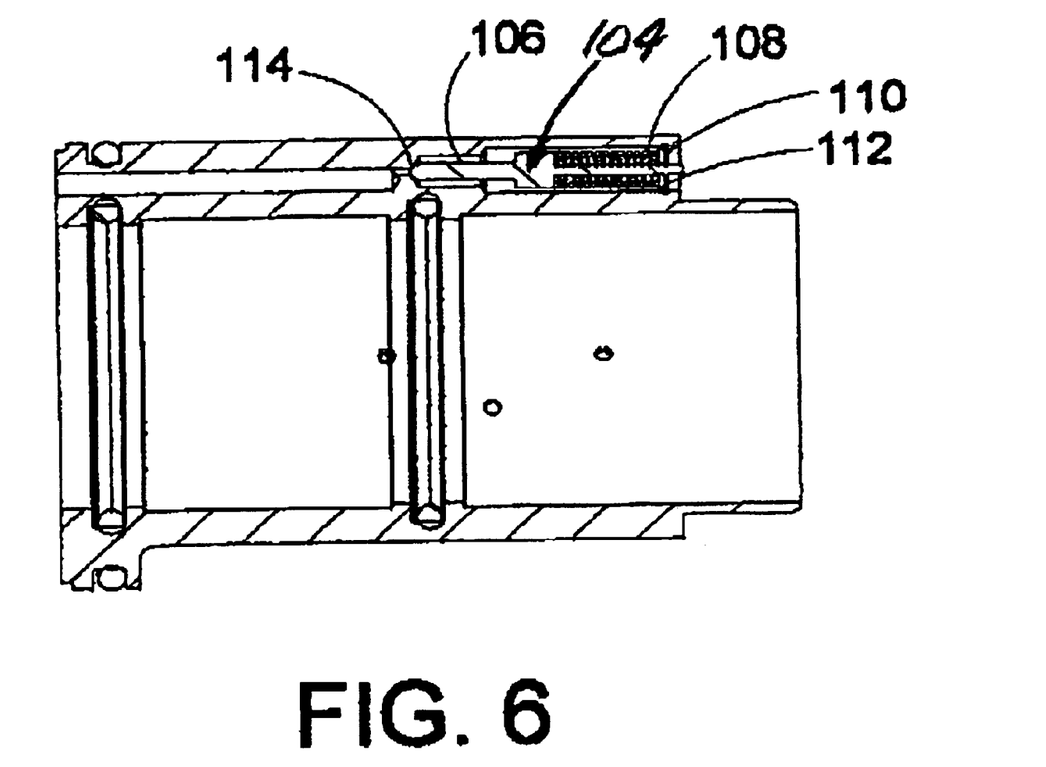
FIG. 6 is a cross-sectional view of the control partition.

The control partition 27 also includes a relief valve 104, as shown in FIGS. 5 and 6. The pressure relief valve 104 includes a valve stem 106, a spring 108, a spring retainer 110, and a retainer ring 112. The valve 104 seats at a location 114 to provide over-pressure relief of the chamber between the control partition 27 and the moving partition 25. As the pressure in this chamber is transmitted through the working chambers of the damper 10, the valve 104 provides over-pressure protection to the other working areas and also provides an upper limit to the extending/lifting force of the damper rod 24.

Figures 7, 8:
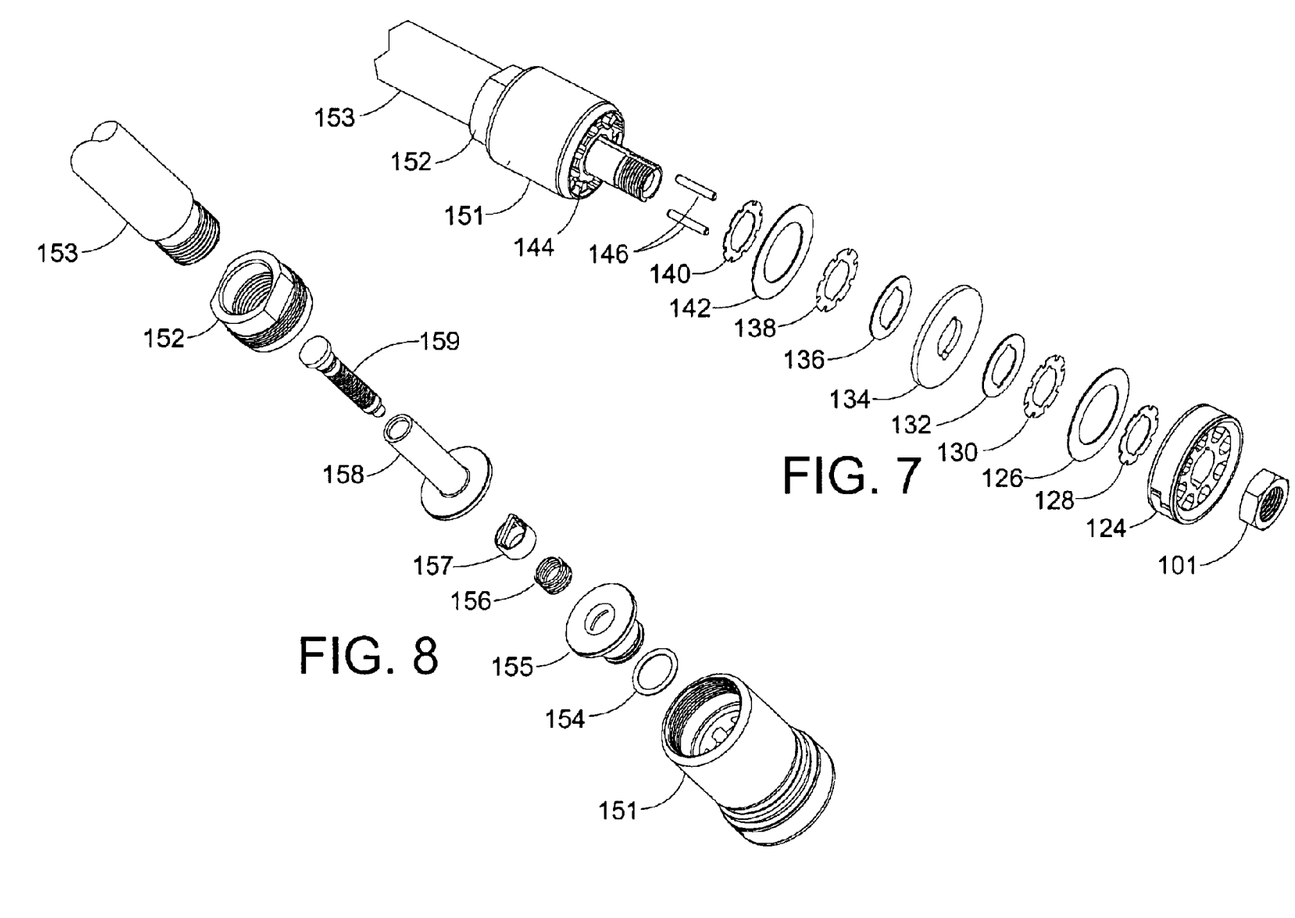
FIG. 7 is an exploded perspective view of a portion of a piston assembly for the suspension damper.
FIG. 8 is an exploded perspective view of another portion of the piston assembly.
Figure 9:
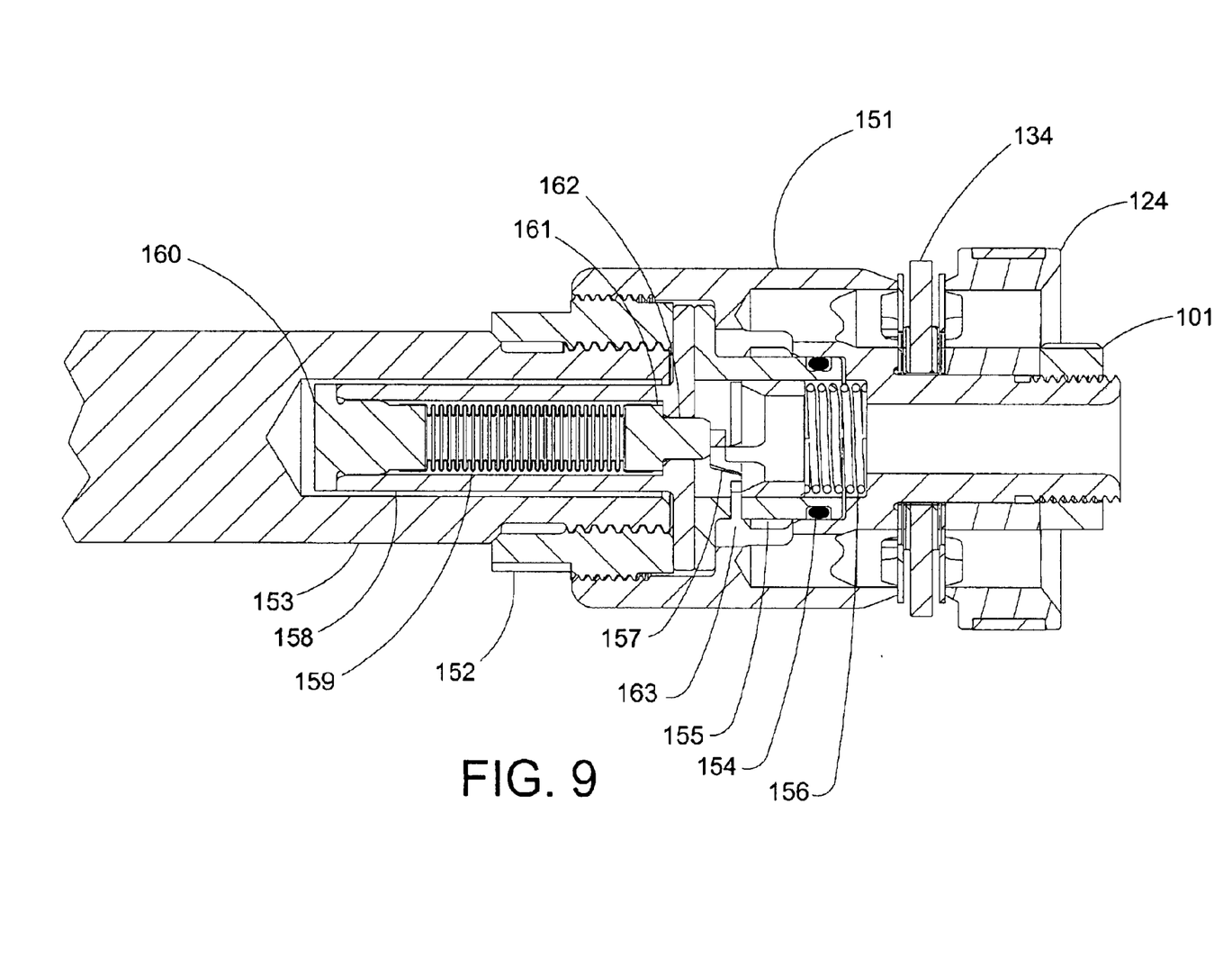
FIG. 9 is a cross-sectional view of the portion of the piston assembly shown in FIG. 9.

The piston assembly 22 consists of a system of tunable orifices and valves that are normally preset when the unit is assembled. FIGS. 7 through 9 show an alternative embodiment 122 of the piston assembly including a piston 124, a valve disc 126, a valve centering disc 128, an orifice disc 130, and a control disc 132. A stop disc 134 separates the actions of parts 124–132 from a controlled portion of the valve system that includes a control disc 136, an orifice disc 138, a centering disc 140, a valve disc 142, and a valve seat 144. Pins 146 are installed in grooves in the piston rod tenon and maintain alignment of the discs. The centering discs 128 and 140 act to keep the valve discs 126 and 142 on center and determine the preload applied to the valve discs. The orifice discs 130 and 138 provide a minimal flow passage (damping at low rates of suspension movement). The control discs 132 and 136, working with the stop disc 134, limit the flexing of the valve discs 126 and 142.

A sealed bellows assembly includes a bellows 159, a bellows cap 160 and a bellows pin end 161 pressed into a bellows case 158. The sealed bellows assembly is held in place in the end of a piston rod 153 with a cylinder 155 by a valve support 151 and a rod adapter 152. A valve spool 157 in the cylinder 155 is held against the bellows pin end 161 by a spring 156. Fluid pressure, from the area below the piston, is applied to the bellows through a gap 162 between the bellows pin end 161 and the bellows case 158. This fluid pressure determines the length of the bellows assembly and the position of the valve spool 155, thereby regulating the closure of a passage 163 and adjusting suspension damping. Fluid pressure variation below the piston due to damping is relatively small compared to pressure variation due to leveling. This pressure relationship and the flow restriction at the gap 162 cause the length of the bellows assembly, and the position of the valve spool 157 and closure of the passage 163, to be determined by the vehicle weight. Operation of this piston assembly is therefore based on the length of the bellows 159 being dependent on external pressure, i.e. higher pressures dictate shorter lengths.

Figures 10, 11:
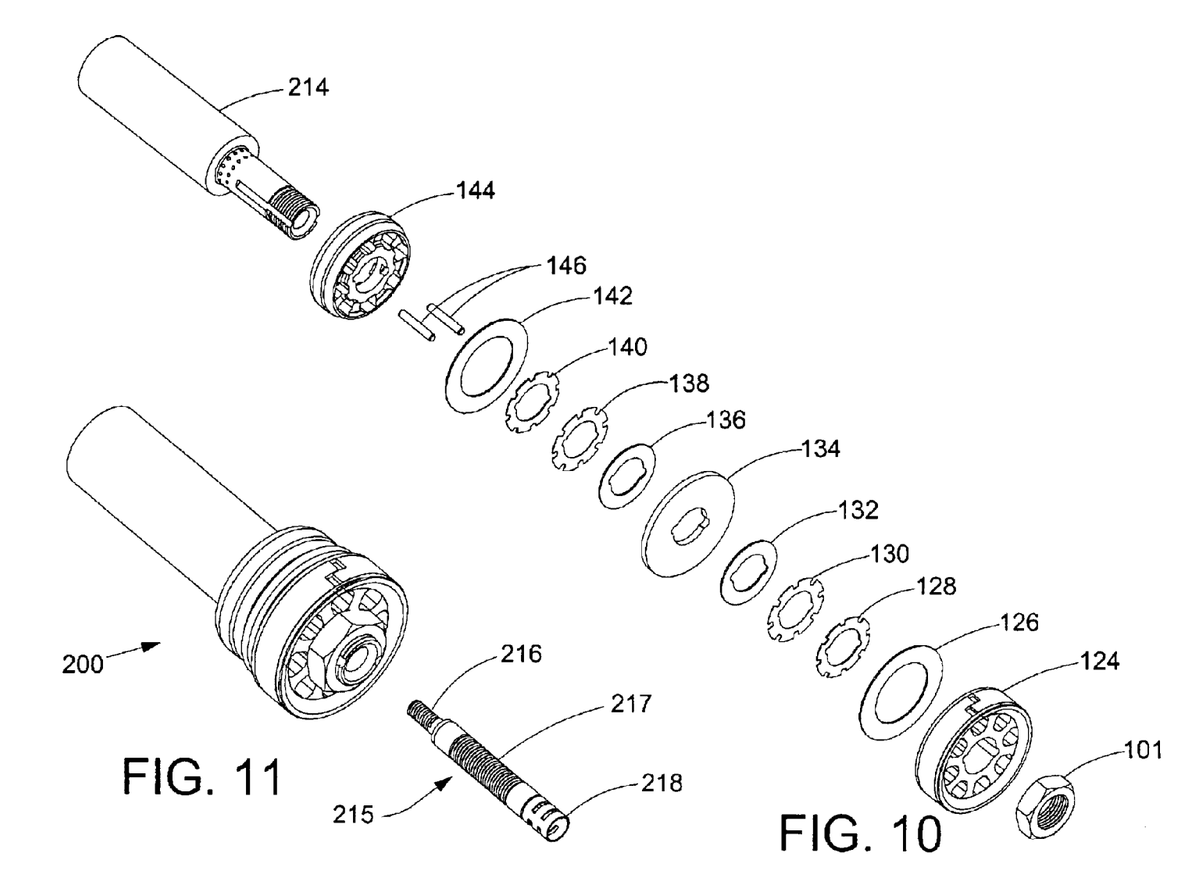
FIG. 10 is an exploded perspective view of an alternative embodiment of the piston assembly.
FIG. 11 is another exploded perspective view of the alternative embodiment of the piston assembly.
Figure 12:
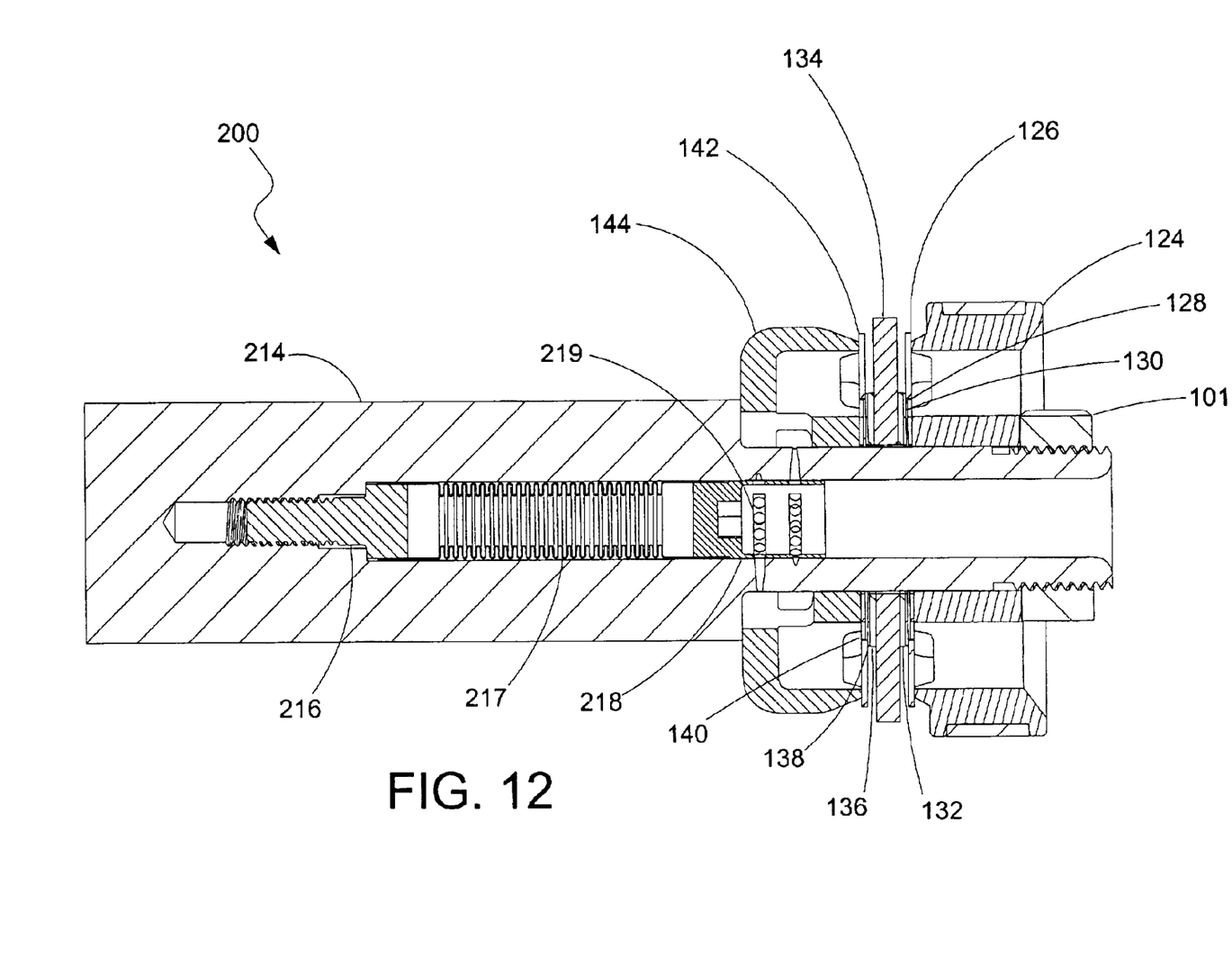
FIG. 12 is a cross-sectional view of the alternative embodiment of the piston assembly shown in FIGS. 11 and 12.

FIGS. 10 through 12 show another alternative embodiment 200 of the piston. A bellows assembly 215 consists of a bellows 217, an anchor end 216, and a valve spool end 218. The bellows assembly is installed in a hole in a piston rod 214. The piston rod 214 has a tenon for the installation of the external valve parts 124–142 held on with a nut 101. The length of the bellows assembly is again controlled by fluid pressure under the piston. Restriction between the exterior of the valve spool end 218 and the inside diameter of the hole in the piston rod 214 dampens fluid flow and dampens the motion of the valve spool end 218. At lower pressures, the bellows assembly is longer, and the passages in the valve spool end 218 are positioned to allow flow through holes in the piston rod tenon. As internal pressures increase, the bellows assembly shortens, restricting and then closing off the holes in the piston rod tenon.

Figure 13:
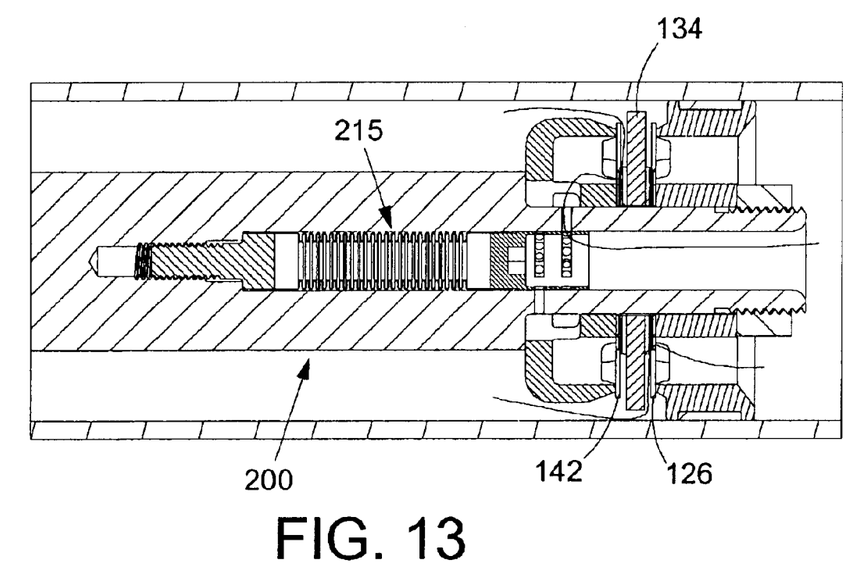
FIGS. 13–18 are cross-sectional views of the piston assembly shown in FIGS. 10 and 11 in various operating positions.
Figure 14:
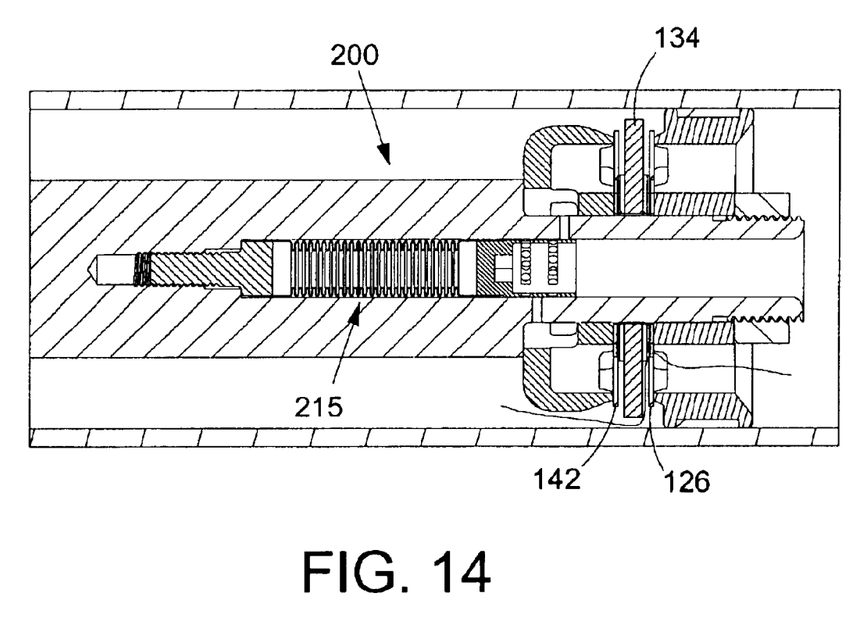
Figure 15:
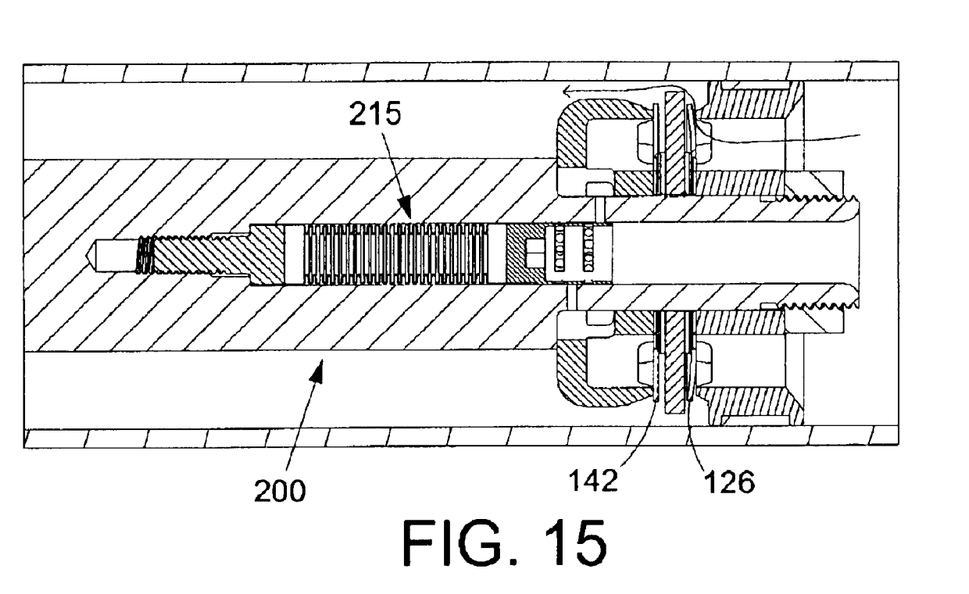
Figure 16:
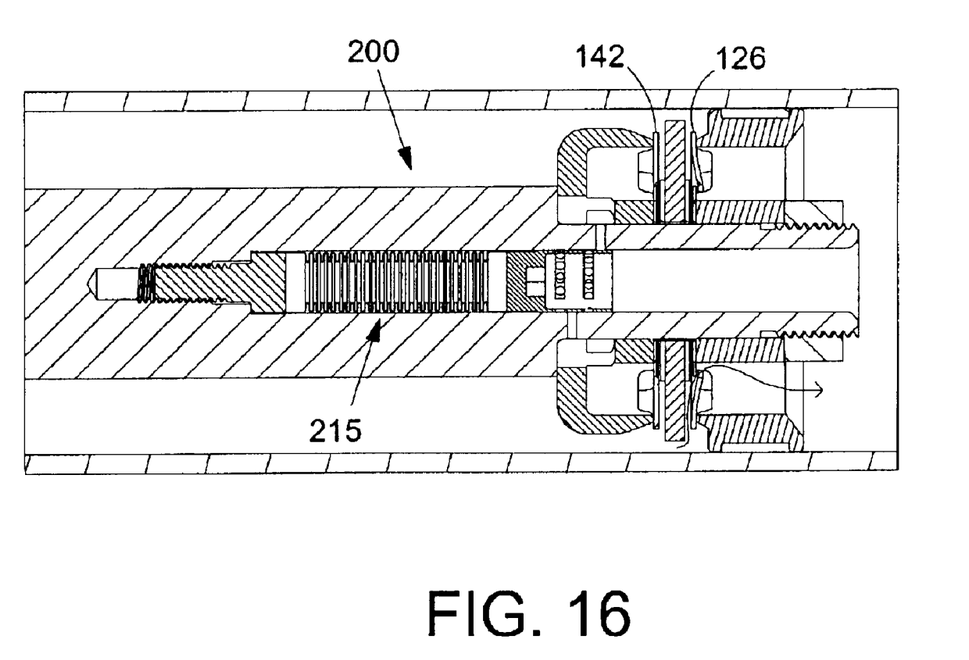
Figure 17:
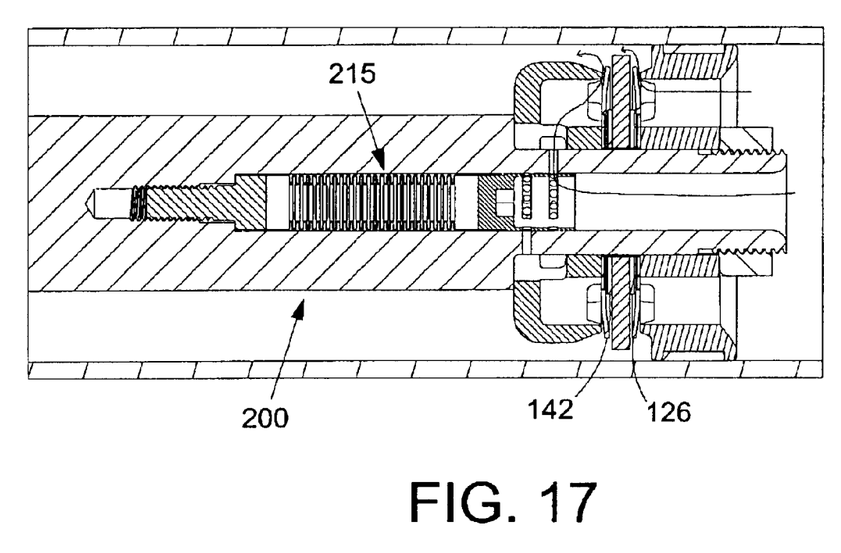
Figure 18:
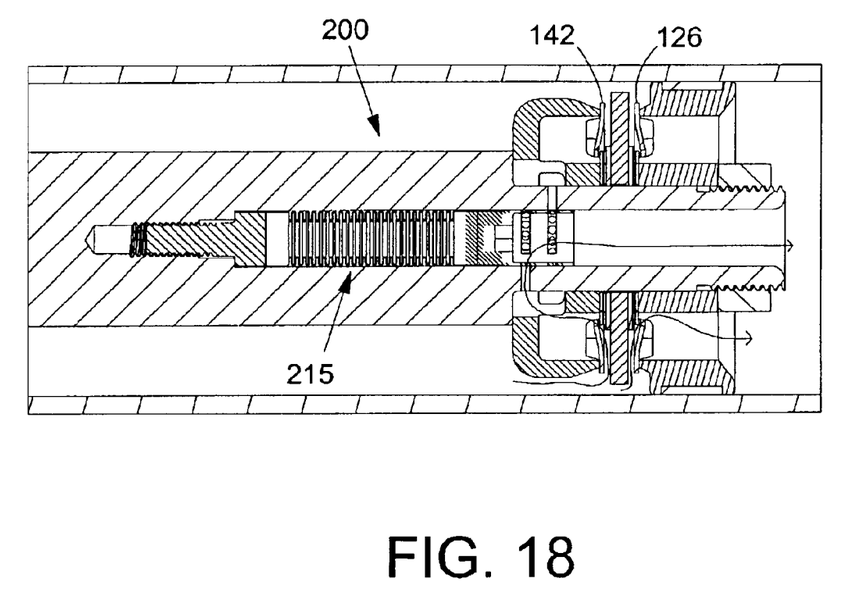

FIG. 13 shows orifice flow through the piston with the load compensation bellows valve in an open position, and FIG. 14 shows the load compensation valve closed as may occur when the vehicle is fully loaded. FIGS. 15 and 16 respectively show valve disc deflections for compression and rebound when the load compensating valve is closed. During a compression event, pressure across the piston causes the exterior of the valve disc to flex away from its seat, allowing fluid flow. During a rebound event, reverse pressure flexes the inside edge of the valve disc, allowing flow. FIGS. 17 and 18 show valve operation when the load compensating valve is allowing flow, such as may occur when the vehicle is lightly loaded. Flexing similar to that shown in FIGS. 15 and 16 occurs, except that both parts of the valve system react.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A suspension damper comprising:
   a cylinder tube disposed within a reservoir tube to define a fluid reservoir, the cylinder tube having at least one first hole;
   a gas cup disposed in the cylinder cube and defining a main gas chamber within the cylinder tube;
   a control partition disposed in the fluid reservoir, the control partition communicating with the at least one hole; and
   a moving partition disposed in the fluid reservoir and defining, a fluid chamber adjacent the control partition, and a pressurized gas in communication with the main gas chamber.

2. The suspension damper of claim 1 further comprising a piston disposed in the cylinder tube.

3. The suspension damper of claim 2 wherein the piston includes a plurality of passages therethrough.

4. The suspension damper of claim 3 wherein the piston includes a plunger plate disposed proximate the passages.

5. The suspension damper of claim 1 wherein the control partition includes a release valve and an overpressure valve.

6. The suspension damper of claim 1 wherein the cylinder tube has at least one second hole and at least one third hole communicating with the control partition.

7. A suspension damper capable of adjusting height of a motor vehicle, the suspension damper comprising:
   a cylinder tube disposed within a reservoir tube to define a fluid reservoir, the cylinder tube having at least one first hole, at least one second hole, and at least one third hole;
   a gas cup disposed in the cylinder tube and defining a main gas chamber within the cylinder tube;
   a control partition disposed in the fluid reservoir, the control partition communicating with the at least first, second and third holes; and
   a moving partition disposed in the fluid reservoir and defining a fluid chamber adjacent the control partition, and a pressurized gas in communication with the main gas chamber.

8. The suspension damper of claim 7 further comprising a piston disposed in the cylinder tube.

9. The suspension damper of claim 8 wherein the piston includes a plurality of passages therethrough.

10. The suspension damper of claim 9 wherein the piston includes a plunger plate disposed proximate the passages.

11. A suspension damper capable of adjusting height of a motor vehicle, the suspension damper comprising:
    a cylinder tube disposed within a reservoir tube to define a fluid reservoir, the cylinder tube having at least one first hole, at least one second hole, and at least one third hole;
    a control partition disposed in the fluid reservoir, the control partition communicating with the at least first, second and third holes, and defining a fluid chamber adjacent the control partition; and
    a gas cup disposed in the cylinder tube and defining a main gas chamber within the cylinder tube, and wherein the control partition defines a pressurized gas in communication with the main gas chamber defined by a gas cup.

12. A suspension damper capable of adjusting the height of a motor vehicle, the suspension damper comprising:
    a cylinder tube disposed within a reservoir tube to define a fluid reservoir, the cylinder tube having at least one first hole, at least one second hole, and at least one third hole; and
    a control partition disposed in the fluid reservoir, the control partition communicating with the at least first, second and third holes;
    the control partition including a pump, a release valve, and an overpressure valve.

13. A suspension damper capable of adjusting height of a motor vehicle, the suspension damper comprising:
    a cylinder tube disposed within a reservoir tube to define a fluid reservoir, the cylinder tube having at least one first hole, at least one second hole, and at least one third hole;
    a gas cup disposed within the cylinder tube to define a main gas chamber within the cylinder tube;
    a control partition disposed in the fluid reservoir, the control partition communicating with the at least first, second and third holes;
    a piston disposed in the cylinder tube, the piston including a plurality of passages therethrough; and
    a moving partition disposed in the fluid reservoir, the moving partition defining a fluid chamber adjacent to the control partition and a pressurized gas chamber in communication with the main gas chamber defined by the gas cup.

* * * * *